US012175450B2

(12) United States Patent
Lee et al.

(10) Patent No.: US 12,175,450 B2
(45) Date of Patent: Dec. 24, 2024

(54) ULTRA-WIDEBAND-ENABLED DEVICES AND SYSTEMS

(71) Applicant: MASTERCARD INTERNATIONAL INCORPORATED, Purchase, NY (US)

(72) Inventors: Charles Sangwon Lee, Briarcliff Manor, NY (US); Charl Frederik Botes, Largo, FL (US); Gabriel Beltramino, New York, NY (US); Danielle Jean Eininger, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/196,646

(22) Filed: May 12, 2023

(65) Prior Publication Data
US 2023/0281599 A1 Sep. 7, 2023

Related U.S. Application Data

(62) Division of application No. 17/220,415, filed on Apr. 1, 2021, now Pat. No. 11,687,913.
(Continued)

(51) Int. Cl.
*G06Q 20/32* (2012.01)
*G06K 7/10* (2006.01)
(Continued)

(52) U.S. Cl.
CPC ..... *G06Q 20/3278* (2013.01); *G06K 7/10306* (2013.01); *G06Q 20/20* (2013.01); *G06Q 20/3674* (2013.01); *G06Q 20/3825* (2013.01)

(58) Field of Classification Search
CPC ............... G06Q 20/3278; G06Q 20/20; G06Q 20/3674; G06Q 20/3825; G06K 7/10306
(Continued)

(56) References Cited

U.S. PATENT DOCUMENTS

2015/0039494 A1 2/2015 Sinton et al.
2015/0235204 A1\* 8/2015 Wallner ................ G07F 7/0893
235/492
(Continued)

FOREIGN PATENT DOCUMENTS

EP 4236382 A2 \* 8/2023 ............. G06F 21/44
KR 20110107782 \* 10/2011

OTHER PUBLICATIONS

Non-Final Office Action issued in U.S. Appl. No. 17/220,415, mailed Sep. 27, 2022, 19 pages.
(Continued)

*Primary Examiner* — Sara C Hamilton
(74) *Attorney, Agent, or Firm* — Talem IP Law, LLP (57) ABSTRACT

An ultra-wideband (UWB)-enabled payment acceptance system can include a UWB anchor and a terminal device. The UWB anchor identifies UWB-enabled devices within a vicinity; and in response to receiving an indication of an intent to perform a payment transaction from a particular UWB-enabled device, the UWB anchor establishes a secure communication channel with the particular UWB-enabled device. The terminal device, via the UWB anchor, communicates transaction related information over the secure communication channel to the particular UWB-enabled device and receives a transaction payload from the particular UWB-enabled device over the secure communication channel. A UWB-enabled device includes a processor, storage, a battery, and a UWB chip. Instructions can be stored in the storage of the UWB-enabled device that when executed by the processor direct the UWB-enabled device to perform various processes supporting frictionless transactions, such as with respect to the UWB-enabled payment acceptance system.

13 Claims, 10 Drawing Sheets

Related U.S. Application Data

(60) Provisional application No. 63/003,441, filed on Apr. 1, 2020.

(51) Int. Cl.
    *G06Q 20/20* (2012.01)
    *G06Q 20/36* (2012.01)
    *G06Q 20/38* (2012.01)

(58) Field of Classification Search
    USPC .......................................................... 705/44
    See application file for complete search history.

(56) References Cited

U.S. PATENT DOCUMENTS

| | | | |
|---|---|---|---|
| 2017/0083915 | A1 | 3/2017 | Collinge et al. |
| 2018/0331414 | A1 | 11/2018 | Tunnell et al. |
| 2019/0249538 | A1 | 8/2019 | Menard et al. |
| 2021/0314022 | A1* | 10/2021 | Jang ..................... H04W 4/023 |

OTHER PUBLICATIONS

Maurice Rupp et al. "Smart Shopping Using Indoor Localization" Dec. 31, 2019, 31 pages.

\* cited by examiner

ULTRA-WIDEBAND-ENABLED DEVICES AND SYSTEMS

BACKGROUND

Ultra-wideband (UWB) is a short-range, wireless communication protocol. UWB-enabled devices can communicate with one another and includes components supporting a high spatial awareness/precision and low power consumption. UWB is based on the IEEE 802.15.4 standard, which defines the operation of low-rate wireless personal area networks (LR-WPANs). By including UWB chips in devices such as a phone or internet of things (IOT) device, applications can leverage the UWB to recognize the device's surroundings and interact with the objects around the device (e.g., other phones or IOT devices).

BRIEF SUMMARY

Ultra-wideband-enabled devices and systems can enable contactless, frictionless transactions over longer distances than the current 4 cm available with near field communication (NFC) or radio frequency identification (RFID).

An ultra-wideband-enabled device includes a processor, a storage, a battery, and an ultra-wideband (UWB) chip. The UWB chip is configured to transmit pulses and, upon receiving an indication of another UWB chip within a vicinity, perform ranging operations to determine distances between the UWB-enabled device and the other UWB chip. The UWB-enabled device further includes instructions stored on the storage that when executed by the processor direct the UWB-enabled device to: engage the UWB chip to initiate the transmission of pulses and receive, via a secure communication channel established between the UWB chip and a UWB-enabled payment acceptance system comprising the other UWB chip, transaction related information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A and 2B illustrate UWB-enabled payment operation.

DETAILED DESCRIPTION

Ultra-wideband-enabled devices and systems can enable contactless, frictionless transactions over longer distances than the current 4 cm available with NFC or RFID.

Figure 1:
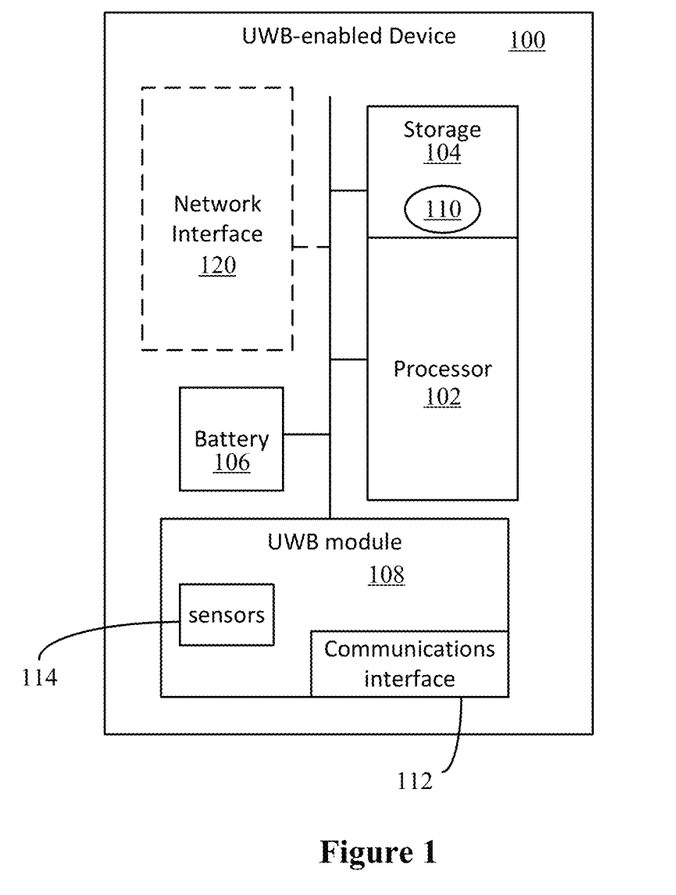
FIG. 1 illustrates an example ultra-wideband-enabled device that can be used to support frictionless transactions as described herein.

FIG. 1 illustrates an example ultra-wideband-enabled device that can be used to support frictionless transactions as described herein. Referring to FIG. 1, an ultra-wideband-enabled device 100 can include a processor 102, storage 104, a battery 106 (or a power converter/connector for an external power supply), and an ultra-wideband (UWB) chip 108. Instructions 110 can be stored in the storage 104 that when executed by the processor 102 direct the UWB-enabled device 100 to perform various processes supporting frictionless transactions such as described herein.

The UWB chip 108 includes UWB hardware (e.g., a UWB device) providing at least a communications interface 112 and sensors 114 for 360-degree spatial positioning. A devoted memory and processor can be included as part of the UWB chip 108. Accordingly, a UWB chip 108 may include circuitry, a transceiver, an antenna (its own or shared) and storage. The UWB chip 108 operates by sending pulses at high frequency (e.g., 60 GHz signal) across a wide spectrum frequency (e.g., 500 MHz wide). A corresponding receiver is able to translate the pulses into data based on pulse sequences. When two UWB chips detect each other's transmissions, the two devices can start ranging, or measuring, their distance from each other. For example, time of flight measurements may be taken between the devices to calculate the roundtrip time of challenge/response packets. A channel can thus be formed between the two devices. Advantageously, UWB is very low power while being able to transmit high bandwidth (e.g., 500 MHz) of information to other devices up to 30 feet away.

The processor 102 can include any suitable processing devices, such as a microprocessor, central processing unit (CPU), graphics processing unit (GPU), field programmable gate arrays (FPGAs), application-specific integrated circuits (ASICs), logic circuits, and state machines.

The storage 104 can include volatile (e.g., dynamic random-access memory (DRAM), static random-access memory (SRAM)) and non-volatile memory (e.g., flash, magnetic random access memory (MRAM, FeRAM)). Non-volatile memory can be used as persistent memory since non-volatile memory does not require power to maintain the stored information. The memory of storage 104 may be removable or non-removable.

In some cases, the UWB-enabled device 100 can further include a network interface 120 as well as other components found in computing devices such as mobile phones and internet of things (JOT) devices (e.g., speakers, vehicles, appliances, and any other article of manufacture that has a computing device with network capabilities). Network interface 120 may include the interfaces and logic for communicating over various networks such as via short range wireless connectivity (e.g., near field communication (NFC)), via radio frequency protocols (e.g., Bluetooth, Wi-Fi using IEEE standards 802.11, cellular data protocols using GSM, CDMA, 3G, 4G, 5G etc., satellite), and via wired connections (e.g., ethernet). The particular types of communications available via network interface 120 depends on implementation.

Current UWB devices have 360-degree spatial positioning, with accuracy currently up to ±3°, within ±10 cm. UWB communication channels are low bandwidth, but of sufficient bandwidth to send application protocol data unit (APDU) commands for payment. APDU is the communication unit between a smart card reader and a smart card. For contact-based payment APDU commands, the structure of the APDU is currently defined by ISO/IEC 7816-4:2013, Identification cards—Integrated circuit cards—part 4: Organization, security and commands for interchange. For contactless payment APDU commands, the structure of the APDU is currently defined by ISO/IEC 14443, Cards and security devices for personal identification—Contactless proximity objects. UWB has a low power consumption, which makes it suitable for mobile devices and other wireless and battery powered devices. Security extensions are available to prevent man-in-the-middle relay attacks, which provides security for payment applications. Of course, other commands may be used that fall under different standards or structures.

A UWB-enabled system can include a payment device with UWB capability and an acceptance device with UWB capability. The two devices can each be embodied as UWB-enabled device 100 such as described with respect to FIG. 1. Example payment devices include mobile phones, vehicles, and personal devices such as a key fob. Payment devices may contain a digital wallet and credentials. Example acceptance devices include mobile phones, POS terminals, vehicles, parking meters, fuel pumps, transit terminals, vending machines, digital displays, computers, and smart speakers. The UWB technology in the payment and acceptance devices can be used for device identification, communication channel, security, consumer authentication, and payment credentials. This supports payment authentication; digital identification; personalized, location-based marketing (and content delivery); and access control.

The real-time accuracy of UWB measurements means an acceptance device in the form of a UWB-enabled system can know, with a very high degree of certainty, the precise location and approach angle of a payment device and whether the payment device is stationary or moving toward or away from a given acceptance environment (e.g., Terminal/POS/Reader). For example, a UWB-enabled system can determine if a consumer carrying a payment device is moving towards and approaching a payment environment (e.g., a checkout counter) or leaving the payment environment (e.g., the checkout counter). Thus, based on the movement of the consumer, the Terminal POS (Reader) can be allowed to interact with the UWB-enabled payment device and share the necessary information in order to perform a secure payment transaction.

The UWB-enabled systems are suitable for payment environments benefiting from spatial awareness, longer distances available for accurate communication, and approach and departure angle awareness. Such environments include, but are not limited to, fuel forecourts, transit environments, drive thru restaurants, and IoT and machine-to-machine (M2M) payment experiences.

Figure 2A:
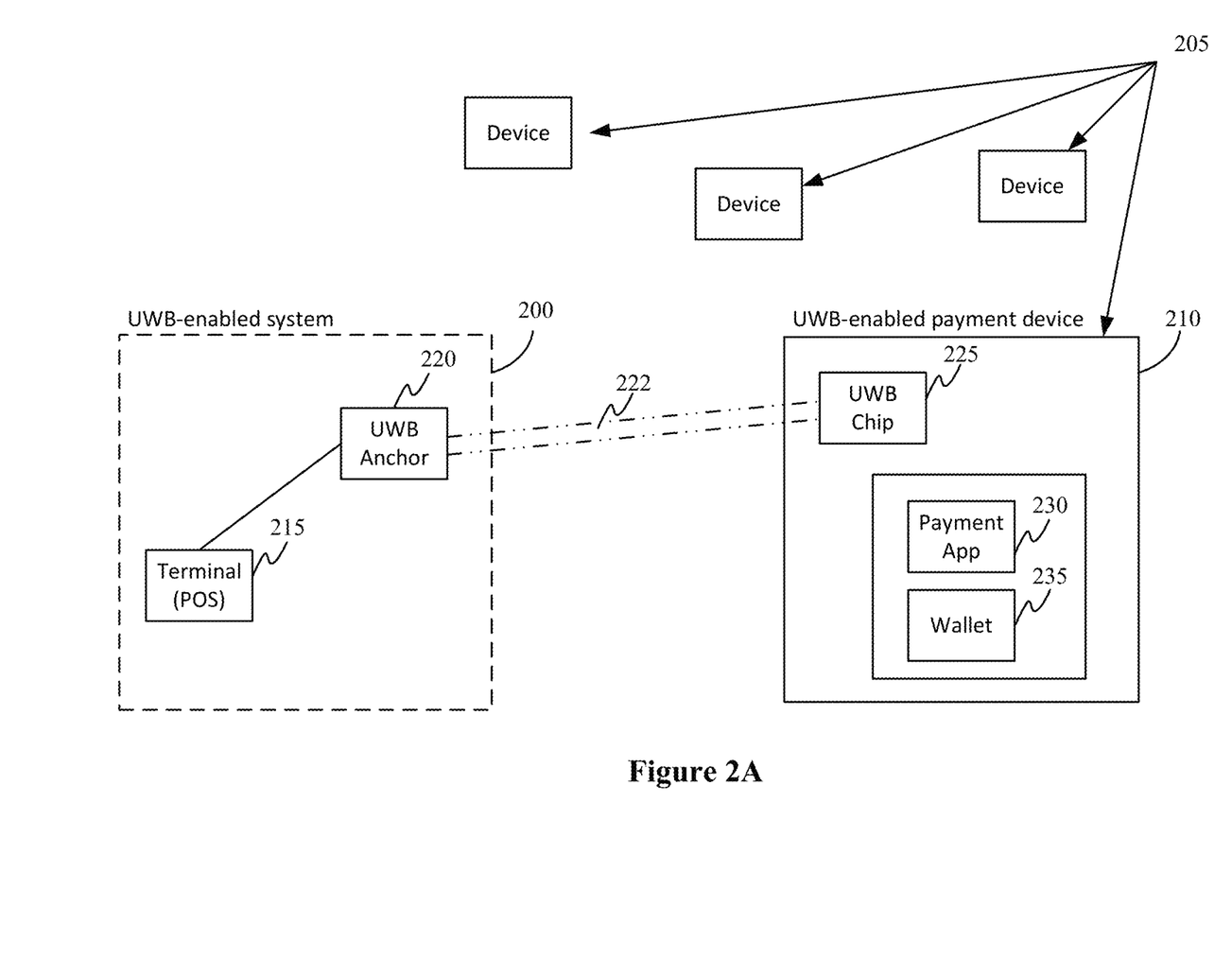
FIG. 2A illustrates a UWB-enabled payment operation environment and FIG. 2B illustrates a process flow diagram.
Figure 2B:
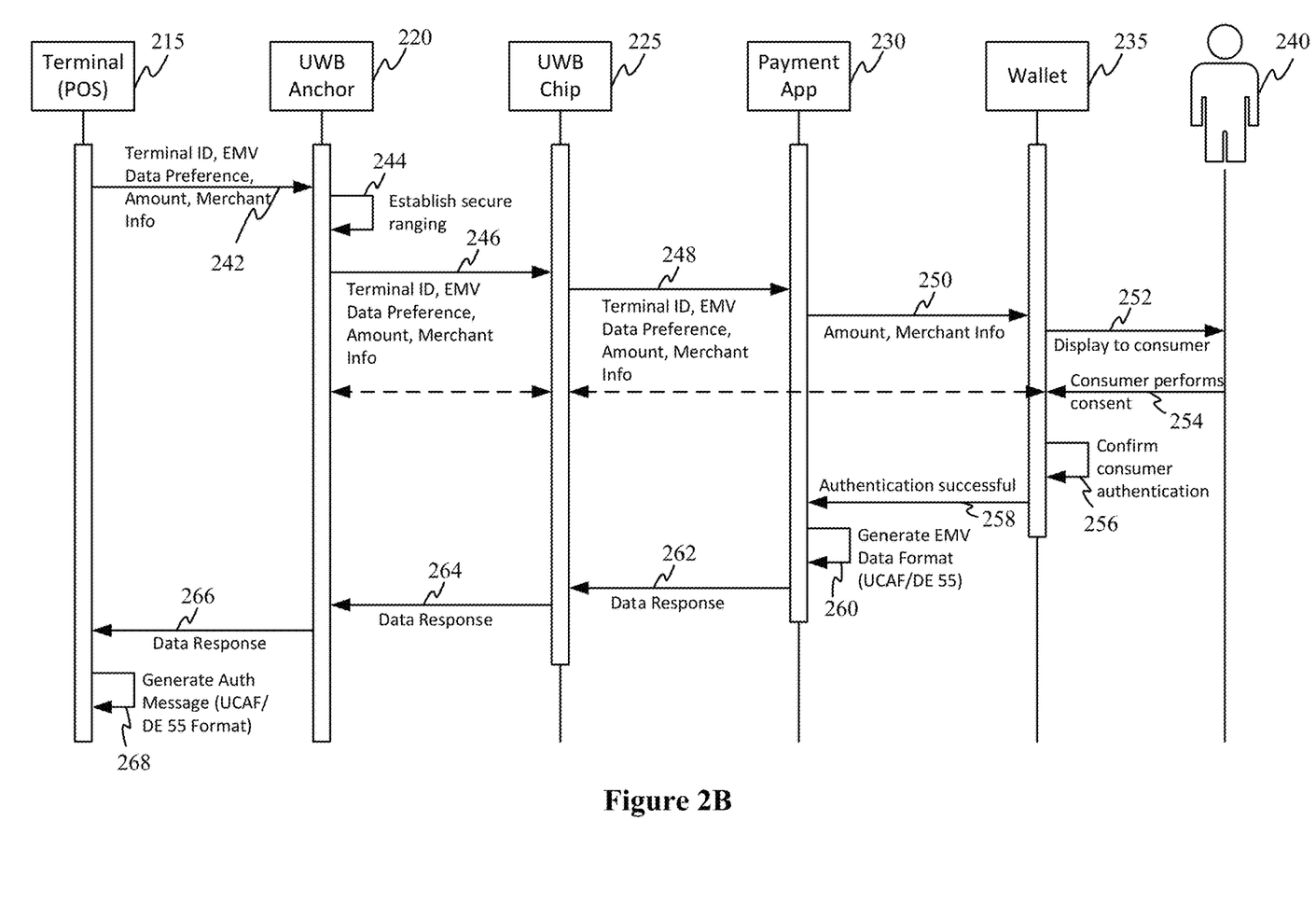

FIGS. 2A and 2B illustrate UWB-enabled payment operation. FIG. 2A illustrates a UWB-enabled payment operation environment and FIG. 2B illustrates a process flow diagram. Referring to FIG. 2A, in a UWB-enabled payment operation environment, a UWB-enabled system 200 can interact with and communicate with any of a number of UWB-enabled payment devices 205 that may be in its vicinity, including UWB-enabled payment device 210, to perform secure payment operations. As mentioned above, aspects of the UWB-enabled system 200 (as a payment acceptance device) and aspects of the UWB-enabled payment devices 205 and UWB-enabled payment device 210 may be embodied as described with respect to UWB-enabled device 100 of FIG. 1.

The UWB-enabled system 200 can include a payment terminal 215 and a UWB anchor 220. Terminal 215 can be a computing device such as a point-of-sale terminal or a mobile device (e.g., smart phone, tablet). The terminal 215 and anchor 220 may be part of a same device (e.g., as chips on a same board or chips on separate boards co-located in a same housing) or be separate computing devices that communicate with each other via any suitable wired or wireless communication protocols that can maintain secure transfer of information between the two devices located a distance from each other. In any of these cases, the terminal 215 can be considered to be communicably coupled to the UWB anchor 220.

The UWB-enabled payment device 210 can include a UWB chip 225 and software including a payment application 230 and a wallet application 235. The UWB chip 225 can be configured to transmit pulses and upon receiving an indication of another UWB chip (e.g., such as at UWB anchor 220) within a vicinity perform ranging operations to determine distances between the UWB-enabled device (e.g., UWB-enabled payment device 210) and the other UWB chip (e.g., at UWB anchor 220). The payment application 230 provides payment functionality for the UWB-enabled device and the wallet application 235 provides the secure management of payment instruments (e.g., as tokens, encrypted payment card information) at the UWB-enabled device 210. The payment application 230 and wallet application 235 may be part of the same application or are different applications that interact on the device 210.

The terminal 215 (via the anchor 220 which is configured to transmit pulses and upon receiving an indication of another UWB chip within its vicinity will perform ranging operations) will be aware of the UWB-enabled devices 205 in its vicinity, including the device 210 for consumer 240. Based on the UWB protocol, the terminal 215 is able to determine the specific vicinity of the payment devices 205, including the UWB payment device 210 (e.g., using the spatial awareness). In addition, based on the UWB-enabled device 210 approach angle and distance, the terminal (via the anchor 220) is able to determine the intention of the consumer 240 to potentially perform a payment transaction using a UWB secure communication channel 222. In this way, even when there are multiple UWB-enabled devices 205 in the vicinity, it is possible for the terminal 215 to accept payment from a specific UWB-enabled device 210.

Turning to FIG. 2B, the process flow begins once the triggering activity (e.g., angle/distance of device 210 indicating intention to potentially perform a payment transaction) has occurred and after consumer authentication/activation of their UWB-enabled device (e.g., via operations at their device 210). Here, the terminal 215 can communicate transaction information to the UWB-enabled device 210 by sharing (242) transaction related information via the UWB anchor 220. The transaction related information at least includes the amount and merchant information (e.g., merchant name and/or merchant identifier such as a merchant code). In the illustrated implementation, the transaction related information includes, a terminal identifier, EMV data preference, amount, and merchant information. The EMV data preference (e.g., preferred format for payment transaction under the EMV data standards managed by EMVCo). Example preferences can include EMV format of DE 55 data, UCAF format of DE 55 data, AEVV format of DE 55 data, or CAVV format of DE 55 data (where UCAF, AEVV, or CAVV fields supply a cryptogram to derive the data). The UWB anchor 220 establishes (244) a secure communication channel 222 with the UWB-enabled device 210 and communicates (246) the transaction related information to the UWB chip 225 of the UWB-enabled device 210 over the secure communication channel 222. Thus, under a new UWB payment protocol the Merchant device (system 200) can share the transaction related information (e.g., Amount, Merchant Information, Unpredictable Number, UWB-EMV Protocol Format Identifier) with the consumer's UWB-enabled device 210, by sending a single command to the consumers UWB-enabled device 210. This command is not the same as the current APDU command structure used for NFC and EMV payment transactions since, for example, fewer messages and commands are needed in the process flow.

Turning back to FIG. 2B, the UWB chip 225 receives the transaction related information and provides (248) the transaction related information to the payment application 230, which provides (250) the payment amount and merchant information to the wallet application 235, and the amount and merchant information can be displayed (252) to the consumer 240. The consumer 240 performs (254) consent, which can include a trigger received at the wallet application 235 (e.g., via a user interface of the wallet application 235 or based on signals received from sensors, such as an accelerometer, etc., at the device 210). In some cases, the consumer 240 can confirm/consent of the payment by pointing their device at the POS Terminal (Reader) 215. This activity (pointing at the terminal 215 or other specified location/direction) may be identified based on UWB supported positional information (represented in the figure by dotted lines).

The wallet application 235 can perform (256) the consumer authentication and the results (e.g., of successful authentication) are provided (258) to the payment application 230. The authentication process can be any suitable authentication process such as the conventional authentication process carried out by the wallet application when authenticating a user for payment via the wallet 235.

After consumer consent (and successful authentication), the payment application 230 creates a new transaction payload, generating (260) the message/data response in the appropriate EMV data format (which may have been indicated as part of the transaction related information received in step 248). This data response is communicated to the terminal 215 via the secure communication channel 222 between the UWB chip 225 and the UWB anchor 220 in steps 262, 264, and 266. The terminal can then generate (268) the auth message in the appropriate EMV data format. Accordingly, after consumer consent, the UWB-enabled device 210 can share, in a single command, the pay load (generated above) with the UWB POS Terminal (reader) 215, for example, in UCAF format of DE 55 data (EMV truncated information for e-commerce format) or EMV format of DE 55 data (normal POS format).

As can be seen from the process flow diagram of FIG. 2B, there are two transaction related messages on the secure communication channel 222 between the consumer device and the payment acceptance device: the message containing the transaction related information to the consumer device and the payload in the appropriate EMV data format from the consumer device.

The following scenarios include example use cases supported from enabling frictionless M2M based commerce—authentication and payment. It should be understood that, although reference is made to point of sale (POS) terminals, the terminal may be implemented as any suitable point of interaction (POI) hardware.

Figure 3:
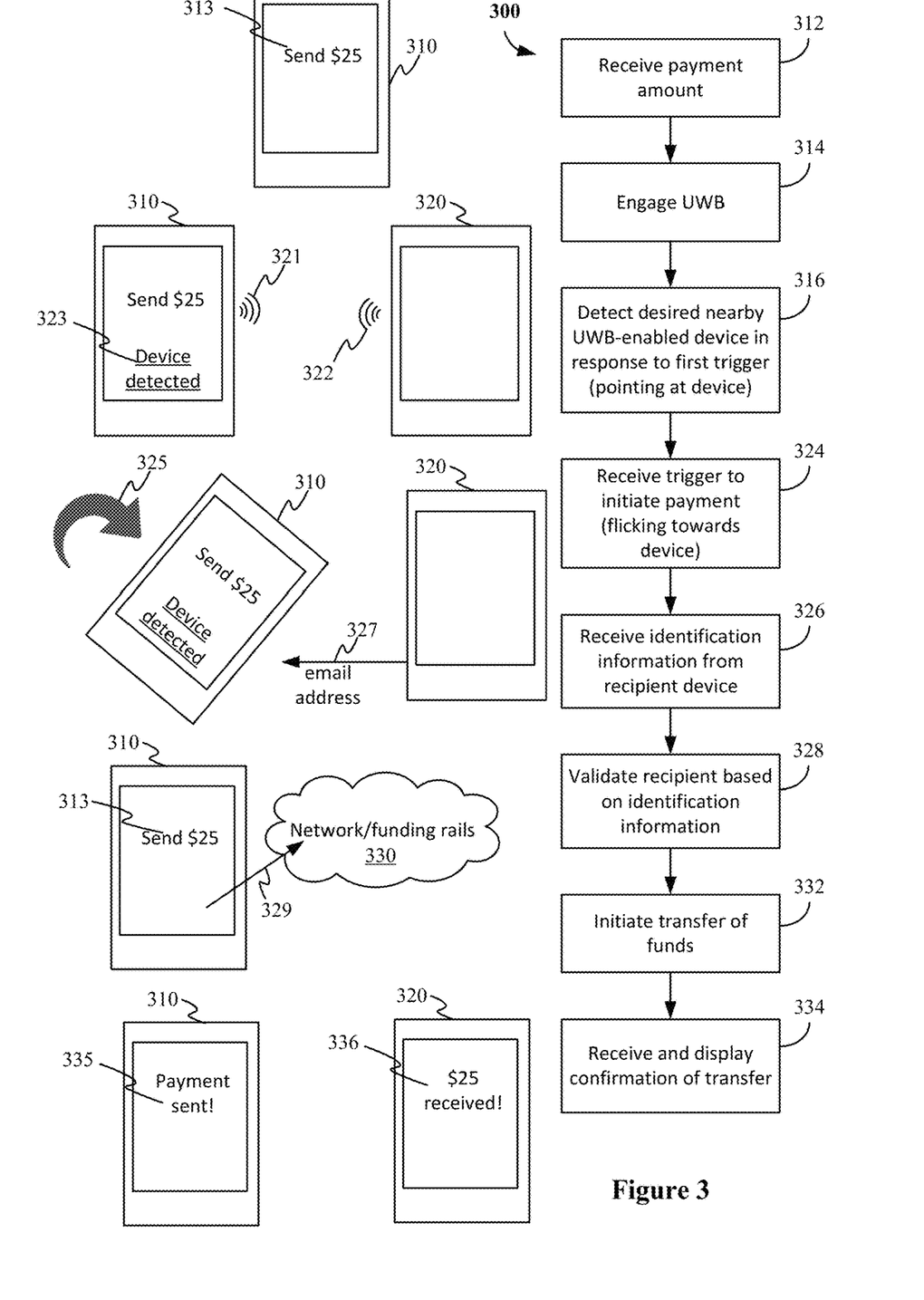
FIG. 3 illustrates a "flick-to-pay" P2P payment application scenario.

FIG. 3 illustrates a "flick-to-pay" P2P payment application scenario. Today, consumers can perform money transfer between individual devices by bringing devices within 4 cm from each other to then provide the instruction from the sender to the receiver's accounts. As provided in the illustrated scenario, it is possible to perform a transaction from further distances.

A method 300 carried out by an application on a UWB-enabled device 310 can include receiving (312) a payment amount, for example, an amount 313 of "$25" to send to another party. The application can engage (314) the UWB module on the device 310 and detect (316) a desired nearby UWB-enabled device 320 in response to receiving a first trigger. The first trigger can be an action of pointing the first UWB-enabled device 310 in the direction of the second UWB-enabled device 320. The first UWB-enabled device 310 may send a signal 321 in the direction that the first device 310 is pointed and receive a signal 322 from the second UWB-enabled device 320 in order to establish a communication channel between the two UWB devices. The application may surface a confirmation 323 in the graphical user interface. The application can receive (324) a trigger, such as a flicking action 325, to initiate payment. The action 325 can cause the UWB device of the first UWB-enabled device 310 to communicate a request for the identification of the recipient from the second UWB-enabled device 320 and can receive (326) transaction related information of identification information, for example, an email address 327, from the recipient device of the second UWB-enabled device 320 over the communication channel. The application can validate (328) the recipient based on the identification information. In one example, the validation can be to match the email address 327 with contact information in contacts resource (e.g., personal address book) on the device 310. Once the recipient is validated, the application can initiate (332) transfer of funds. For example, the first UWB-enabled device 310 can submit the request 329 over the network 330 to the appropriate funding rails. The request 329 may include the amount 313 and the identification information (e.g., email 327), and may be transmitted via a network interface (e.g., network interface 120 of FIG. 1) of the device 310. A confirmation 335 can be received (334) via the same channels and a confirmation of the transfer can be displayed at the device 310. The recipient can also receive a confirmation 336 to their device 320.

Figure 4:
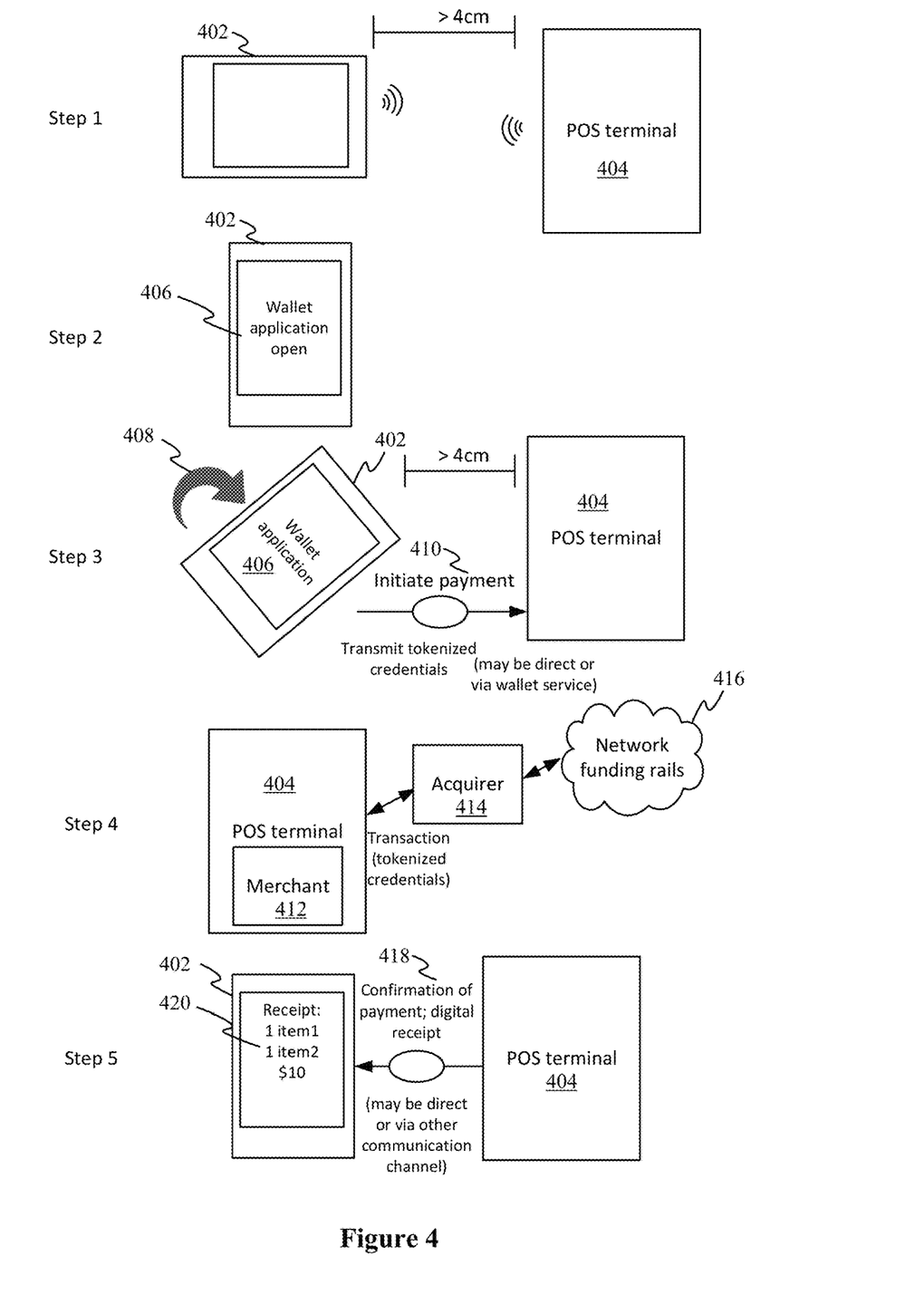
FIG. 4 illustrates a "flick-to-pay" in store payment application scenario.

FIG. 4 illustrates a "flick-to-pay" in store payment application scenario. Currently, a consumer consents to purchase in store when at a POS terminal, for example, by confirming the amount on the POS terminal itself or by acknowledging the purchase on their mobile or wearables device(s) (e.g., by pressing a button on a wearable device to indicate consent). As provided in the illustrated scenario, because the UWB-enabled terminal is able to identify position and gestures, the consumer can perform consent by flicking across the screen of their device towards the UWB merchant anchor at the POS.

As illustrated in FIG. 4, contactless payments can be conducted at a distance of greater than 4 cm. The illustrated scenario is suitable for in store and unattended vending scenarios (but is also suitable for scenarios where the point of sale is a second UWB-enabled device). As shown, in step 1, a consumer's UWB-enabled device 402 can be directed at a UWB-enabled POS terminal 404 (or other UWB-enabled payment acceptance system), for example, indicating an intent to perform a transaction. The UWB-enabled POS terminal 402 may include a UWB device internally or in the form of a dongle, as some examples. In step 2, the engagement between the two devices 402, 404 in step 1 can cause the consumer's mobile application 406 to automatically open (e.g., in response to a signal received at the UWB device of the consumer's UWB-enabled device 402). In some cases, the consumer's mobile application 406 opens in response to receiving transaction information via the channel established between the two devices. In step 3, the consumer "flicks" 408 their device 402 in the direction of the payment terminal 404 to initiate (410) payment. The payment initiation may include transmitting tokenized credentials to the POS terminal 404 (over the channel established between the UWB device of the consumer's UWB-enabled device 402 and the UWB-enabled POS terminal 404). In some cases, the transmission is via the UWB device of the consumer's device 402. In some cases, the transmission is via a wallet service associated with the wallet application 406. In some cases, the consumer's UWB-enabled device 402 generates a transaction payload based on the transaction information received from the UWB-enabled POS terminal 404 and generates a transaction payload that includes the tokenized credentials. In step 4, the tokenized payment credentials received at the POS terminal 404 are passed from the Merchant 412 to Acquirer 414 to Network 416 for processing (e.g., according to conventional payment processing schemes). In step 5, the consumer's UWB-enabled device 402 can receive (418) confirmation of payment and a digital receipt 420. The digital receipt 420 may be direct or via some other communication channel (e.g., text message; email).

Figure 5:
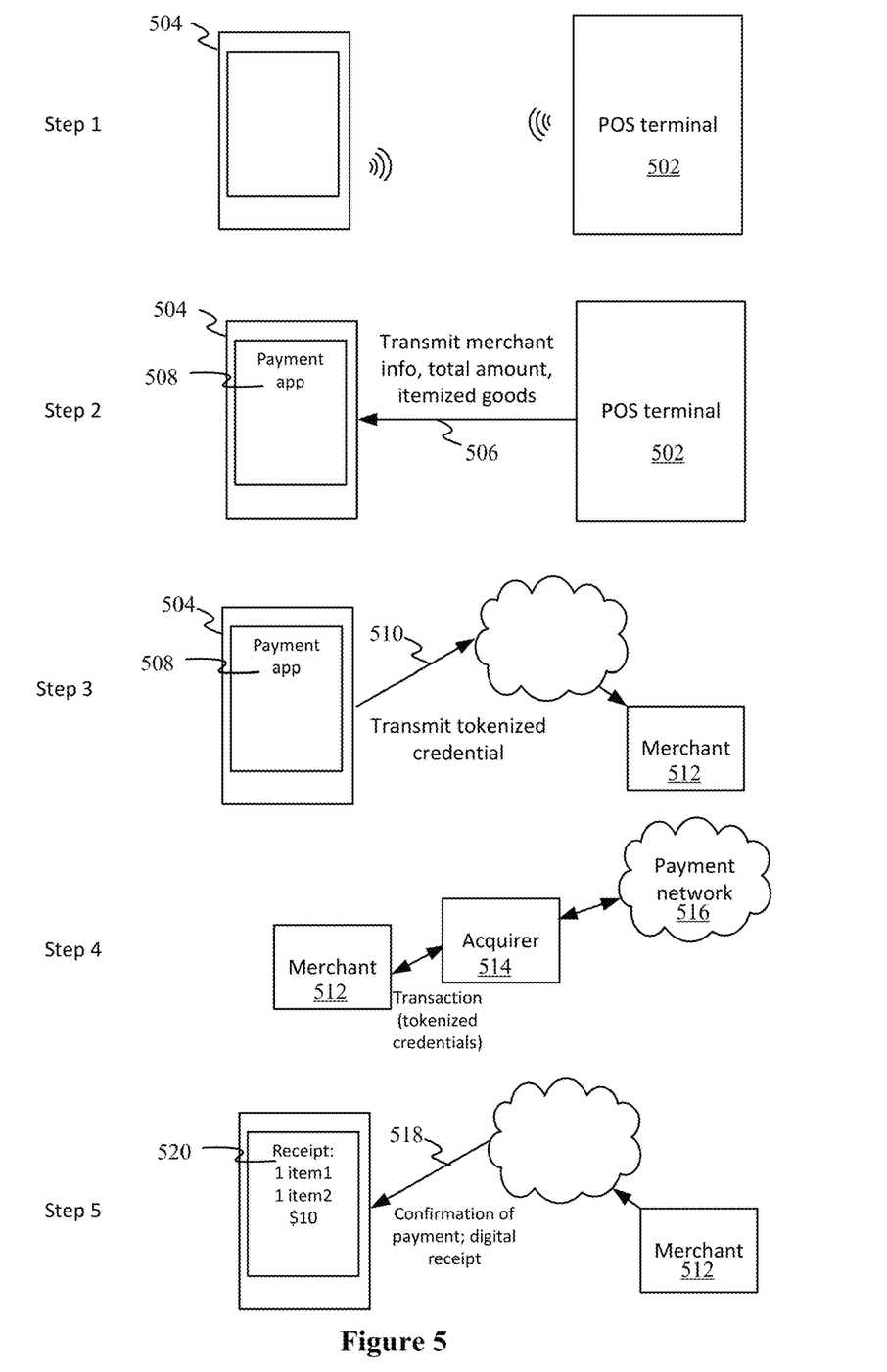
FIG. 5 illustrates a merchant POS extension scenario.

FIG. 5 illustrates a merchant POS extension scenario. In FIG. 5, a scenario where a consumer's device can perform as an extension of a merchant POS is shown. The described scenario is suitable for merchant POS to vehicle as well as merchant POS to mobile device for payment via a digital wallet. As shown, in step 1, a merchant checkout can be in process with a POS terminal 502 that is UWB-enabled. The POS terminal 502 detects the consumer's UWB-enabled device 504. In step 2, the POS terminal 502 transmits (506) the merchant information, total amount, and itemized goods to the consumer's device 504. As described with respect to the scenario of FIG. 4, the distance between the POS terminal 502 and the consumer's device 504 can be greater than 4 cm. In response to receiving a signal from the UWB device at the consumer's device 504, the consumer's mobile app 508 can open automatically and checkout can be enabled. In the case where the consumer's device 504 is a vehicle, the vehicle's dashboard or in-vehicle system for a drive-thru scenario can have an application that opens and receives the merchant information, etc. from the POS terminal 502 for checkout. From the point of view of the consumer's device 504, the consumer's device can receive transaction related information including merchant information, itemized goods, and a total amount, via a communication channel established between the UWB chip of the consumer's device 504 and the POS terminal that is UWB-enabled. As illustrated in step 3. The consumer can then initiate payment (e.g., via the payment application/mobile app 508), transmitting (510) the tokenized credential to the merchant 512 such as possible for e-commerce transactions. In some cases, the transmitting can be accomplished such as conducted for normal face-to-face transactions or shared with the POS terminal 502 via a UWB interface. In step 4, the tokenized payment credentials received at the Merchant 512 are passed to Acquirer 514 to Network 516 for processing (e.g., according to conventional payment processing schemes). In step 5, the consumer receives (518) payment confirmation and digital receipt 520. The digital receipt 520 may be direct or via some other communication channel (e.g., text message; email).

As mentioned above, the POS extension scenario is suitable for drive-thru payments from vehicle to a merchant. The POS extension enables pre-order and pick-up use case, where the UWB-enabled device can send a signal indicated that the device (e.g., phone or vehicle) has arrived. Furthermore, the flick action in the presence of a second UWB-enabled device may support online purchasing using flick-to-pay.

Figure 6:
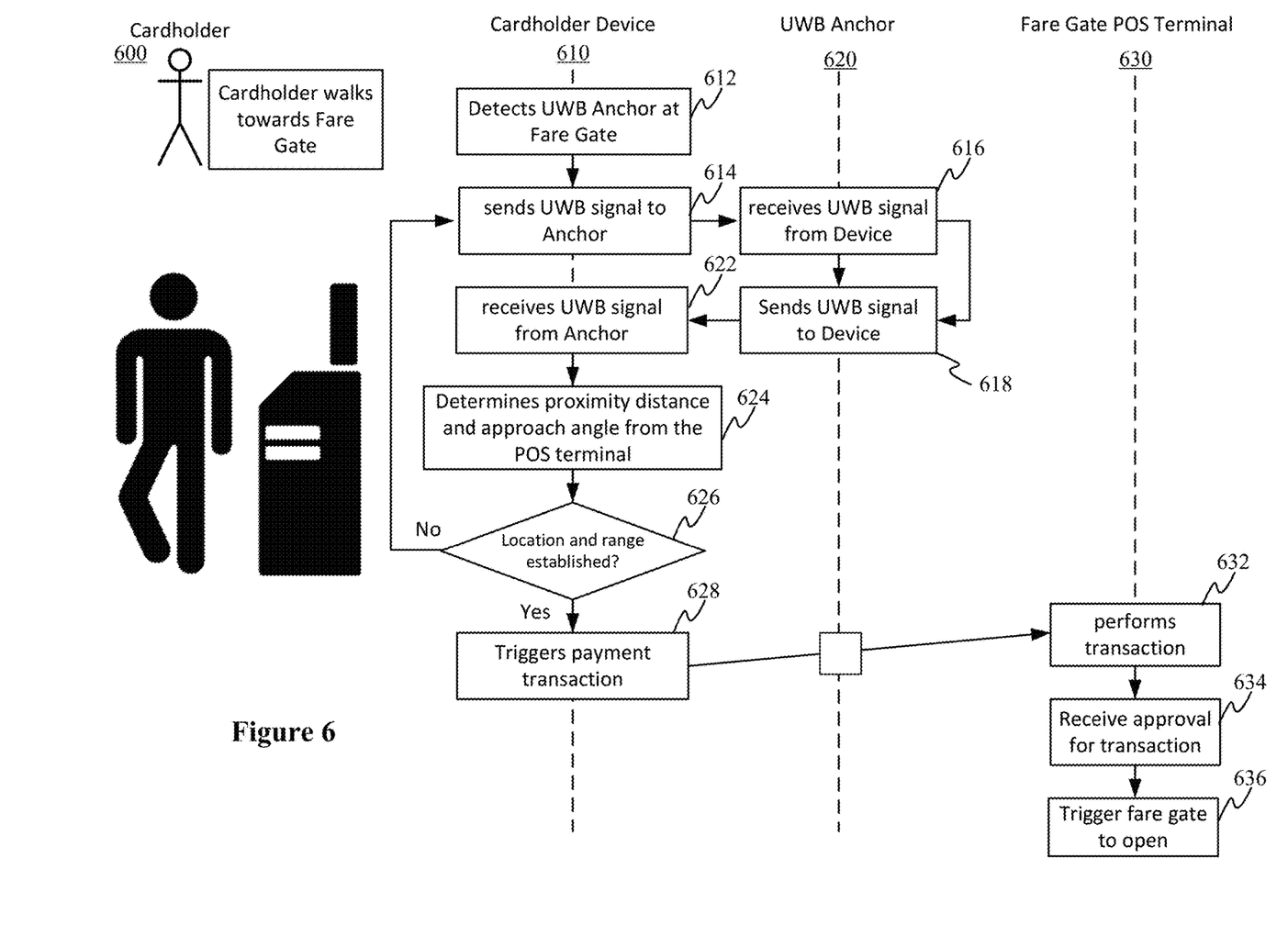
FIG. 6 illustrates a scenario for hands-free payment for transit.

FIG. 6 illustrates a scenario for hands-free payment for transit. Currently in order to make a contactless transaction on a transit gate, a consumer taps their phone on the terminal reader. As provided in the illustrated scenario, it is possible for a consumer to make a contactless transaction on a transit gate, without taking out their phone or wearable to tap on the reader. UWB allows the reader to determine the consumers approach angle and position and thus has a high level of confidence/precision of where the consumer is transacting. Hence, making the experience completely "hands-free", something which is not possible today with available interfaces like NFC, RFID, etc. that no further than 4 cm to interact with the reader (tap on reader).

In the illustrated scenario of FIG. 6, hands-free payment is provided for fare gate access. Referring to FIG. 6, a cardholder 600 with a UWB-enabled device 610 can walk towards a fare gate that includes a UWB anchor 620 and a fare gate POS terminal 630. As the cardholder 600 walks towards the fare gate, the UWB-enabled device 610 detects (612) the UWB anchor 620 at the fare gate and sends (614) a UWB signal to the anchor 620, which receives (616) the UWB signal from the cardholder device 610 and sends (618) its own signal to the cardholder device 610. The cardholder device 610 receives (622) the signal from the anchor 620 and, from the exchange of communications, determines (624) proximity distance and approach angle from the POS terminal 630. The cardholder device 610 uses the UWB signal to determine when it is in the range to the POS terminal to make a transaction, as reflected in the decision (626) of whether location and range are established. If the location and range are not established, the cardholder device 610 continues to communicate with the anchor to determine where in proximity distance the cardholder device is to the fare gate POS terminal 630. Indeed, the cardholder device 610 can determine proximity distance and approach angle to a fare gate at which the UWB anchor is located based on the ranging operations of the UWB chip of the cardholder device 610 with respect to the UWB chip at the anchor 620. Once the cardholder device 610 (via its UWB module) identifies that it is within proximity distance to the POS terminal 630, the cardholder device 610 can trigger (628) payment transaction. The payment transaction that is triggered by the proximity of the cardholder device 610 may follow the operations shown in FIG. 2B, for example, the establishment of a secure communication channel between the cardholder device 610 and the anchor 620 (which may occur coincident with the operations of 614, 616, 618, 622), communication of transaction related information from the terminal 630 (via the anchor 620) to the device 610, consent by user (e.g., by walking through area or by action with respect to the device 610), generation of payload at device 610 and communication of payload from device 610 to terminal 630 via the anchor 620. The Fare Gate POS terminal 630 receives the payment request from the cardholder device 610 and performs (632) the transaction. When approval of the transaction is received (634), the fare gate POS terminal 630 can trigger (636) the fare gate to open for the cardholder 600. In some cases, the fare gate is not a physical gate, but instead a particular environment such as a platform where there is a UWB receiver. When the spatial awareness of the UWB (e.g., such as identified in the exchange of communications such as described in operations 614, 616, 618, 622, 624) determines that the cardholder enters a specific transit environment, a fare can be applied. Fare may be determined at entry or after exit of a transit environment.

Figure 7A:
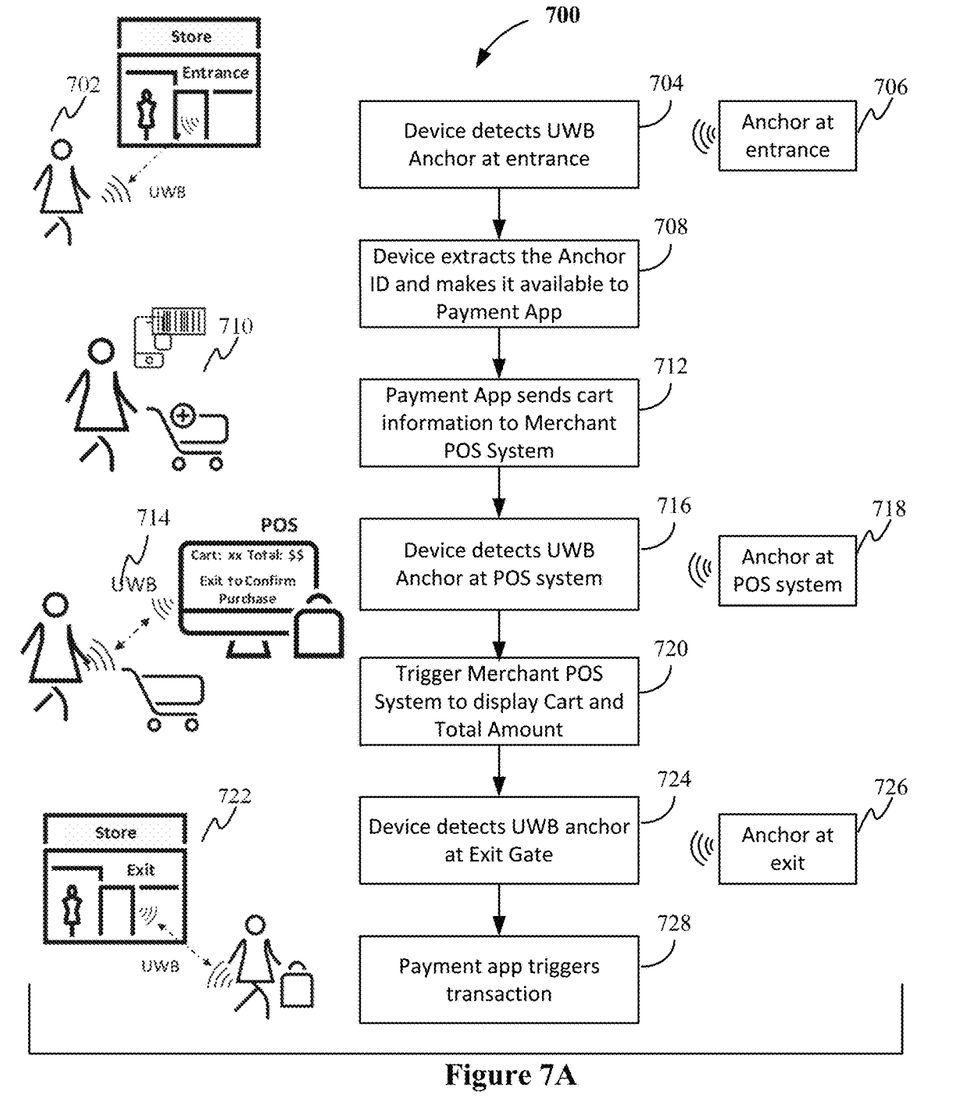
FIGS. 7A and 7B illustrate a frictionless shopping experience using UWB-enabled devices to trigger actions for a shopping application.
Figure 7B:
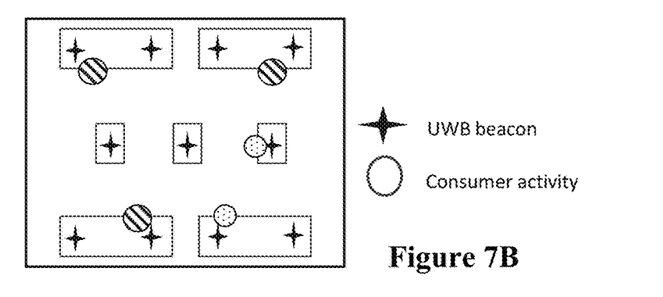

FIGS. 7A and 7B illustrate a frictionless shopping experience using UWB-enabled devices to trigger actions for a shopping application. Currently, consumers at certain merchant locations can tap their device or scan a QR code once they enter the store to share their payment credentials, without knowing the spend amount. As the user continues shopping by scanning the barcodes or QR codes of the items, the items are updated in the purchase basket and the consumer performs a checkout of the basket before exiting the store. Unfortunately, it can be challenging for merchants to know whether the consumer has paid and completed the transaction before the consumer exits the store. As provided in the illustrated scenario, the consumer can connect to the store payment system via a UWB interface to share payment credentials when entering the store and can stay connected throughout the shopping journey. After checking out their purchase basket, the merchant can, using the UWB anchor as the consumer approaches the store exit, identify if the consumer has paid for the goods and send reminders or raise alarms if needed. This is not possible today with the current technologies like Bluetooth low energy (BLE) or WiFi. In addition, it is possible to allow the merchant to determine the exact location of the consumer, offer content (e.g., promotions, information), and direct the consumer to the placement of items.

Referring to FIG. 7A, a UWB-enabled device can perform method 700 upon a consumer entering a store 702. The method 700 begins when the device detects (704) a UWB anchor 706 at the entrance of the store. The device extracts (708) the anchor id and makes it available to the payment/shopping application. The consumer picks up and scans (710) items with their payment app; and the payment app sends (712) cart information to the Merchant POS system. When the consumer approaches (714) the Merchant's POS system near the exit for check out, the device detects (716) the UWB anchor 718 at the POS system and triggers (720) the merchant's POS system (or the payment app on the consumer's device) to display the cart and total amount. When the consumer exits (722) the store, the device detects (724) the UWB anchor 726 at the exit gate, which causes the payment app to trigger (728) the payment transaction to purchase the items in the cart. The payment can be conducted either as an e-commerce or in-store face to face (F2F) payment.

FIG. 7B illustrates a location-based content delivery scenario that can be part of a frictionless shopping experience. The illustrated scenario assumes that a UWB beacon can summarize activity from one device that interacts with multiple beacons in a given environment. Referring to FIG. 7B, UWB beacons are disposed throughout a store. Consumers are able to redeem more relevant offers based on location insights and time spent in store. A consumer's mobile device would interact with beacons located throughout the store, creating a 'heatmap' of that specific consumers activity. Based on that individual's path through the store and time spent viewing items the merchant would be able to derive valuable insights and serve more relevant offers to the consumer while they're still in the store. Offers provided to the consumer may be based on the merchants existing recommendation engines. A consumer's UWB-enabled device can send a digital identifier to support its tracking.

Today consumers at certain merchant locations, can tap their phones once they enter the store, without knowing the final amount. As the user continues shopping by scanning the items, the device is no longer connected to the reader which prevents triggering events/actions to the consumers as they are shopping. The scenario illustrated above allows the consumer to connect to the terminal via UWB when entering the store and stay connected throughout the shopping journey. Hence, allowing precise location-based interaction with the consumer (such as special offers, promotions, etc.). UWB allows the merchant to determine the exact location of the consumer and direct them to the placement of the items. Something that is not possible with the available technologies provided by BLE and WiFi.

UWB-enabled devices can support biometric authentication by combining the biometric capture capabilities of computing devices such as smartphones and the geofencing capabilities of a UWB device. For example, a voice-based payment can be authenticated by receipt of a voice of the consumer and a signal from a UWB device indicating presence.

Figure 8:
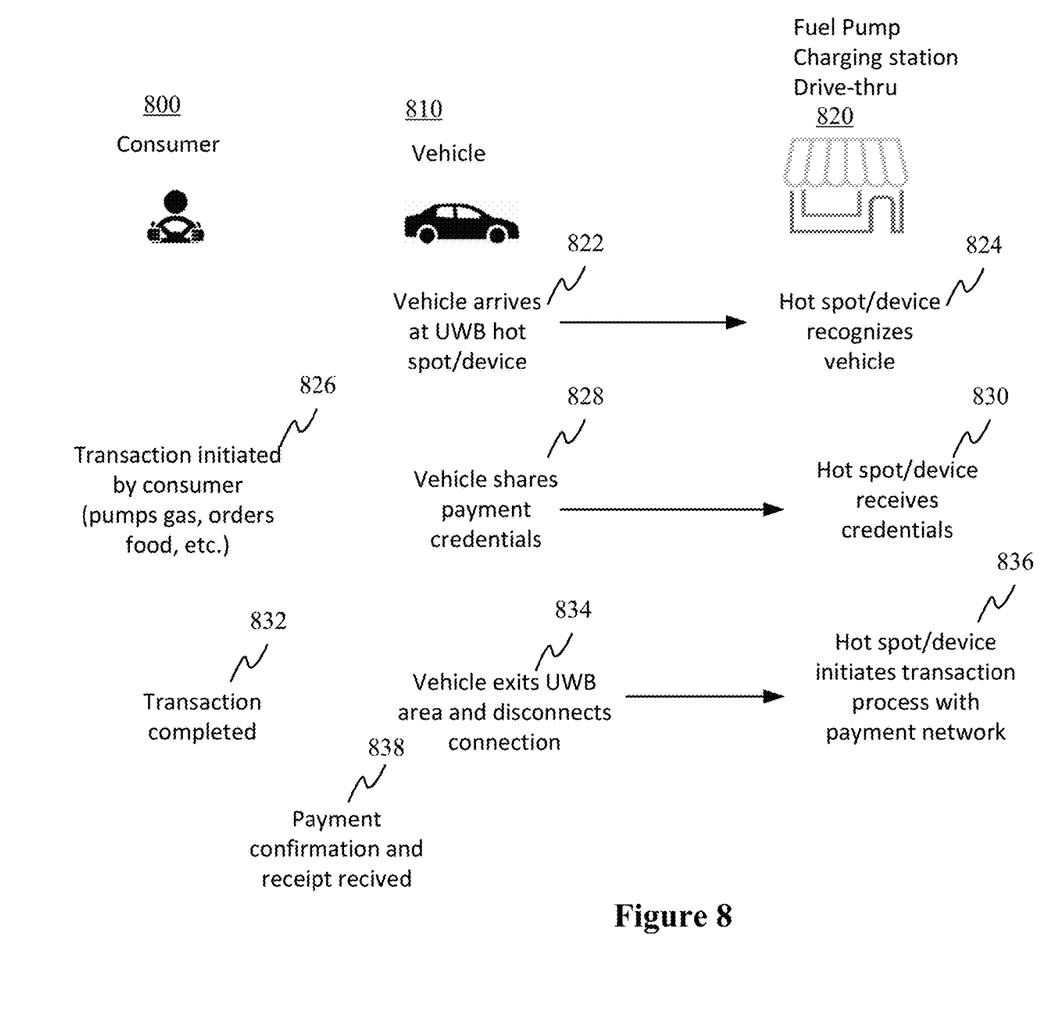
FIG. 8 illustrates an example vehicle to everything (V2E) payment scenario.

FIG. 8 illustrates an example vehicle to everything (V2E) payment scenario. Since vehicles cannot tap a card or phone, a merchant acceptance environment does not have the ability to identify the exact location of the vehicle and the consumer to facilitate frictionless payments without the consumer needing to enter information in a specific merchant mobile application, such as fuel apps that require the pump number and additional information. Currently, in a merchant acceptance environment, payment is available using a mobile app and performing a remote e-commerce transaction. As provided in the illustrated scenario, it is possible for a merchant to identify the exact location of a consumer UWB-enabled vehicle/device and thus not require consumer input within a mobile application or with a vehicle infotainment system.

Referring to FIG. 8, a consumer 800 driving a vehicle 810 can use their UWB-enabled vehicle 810 to conduct transactions, for example at a fuel pump, charging station, or drive thru that contains a hot spot/UWB-enabled device 820 and a payment terminal. In the illustrated scenario, when the vehicle 810 arrives (822) at/comes within proximity to the UWB hot spot/device 820, the two UWB devices can communicate, and the hot spot/device 820 can recognize (824) the vehicle 810. A transaction can be initiated (826) by the consumer 800, for example by pumping gas, ordering food, etc. The vehicle 810 shares (828) payment credentials and the hot spot/device 820 receives (830) the credentials (e.g., such as described with respect to FIG. 2B). The merchant may perform a pre-authorization or just extracts the data from the payment device via UWB and holds onto the data until a final amount is available. The transaction can be completed (832) and when the vehicle exits (834) the UWB area and disconnects connection, the hot spot/device 820 completes (836) the transaction process with a payment network. For example, the merchant can send final authorization with the final transaction amount. The payment can be conducted either as e-commerce or as a F2F payment. The payment confirmation and receipt can then be received (838) when the transaction is approved.

In addition to V2E, vehicle to vehicle (V2V) and vehicle to infrastructure (V2I) payments can be implemented in a similar fashion. For example, congestion pricing can be applied using the communications between a UWB-enabled vehicle and a UWB anchor/POS terminal at designated locations on a highway or toll road. In some cases, congestion payment can be performed between drivers and vehicles. The payment may be initiated autonomously or by a consumer.

Figure 9:
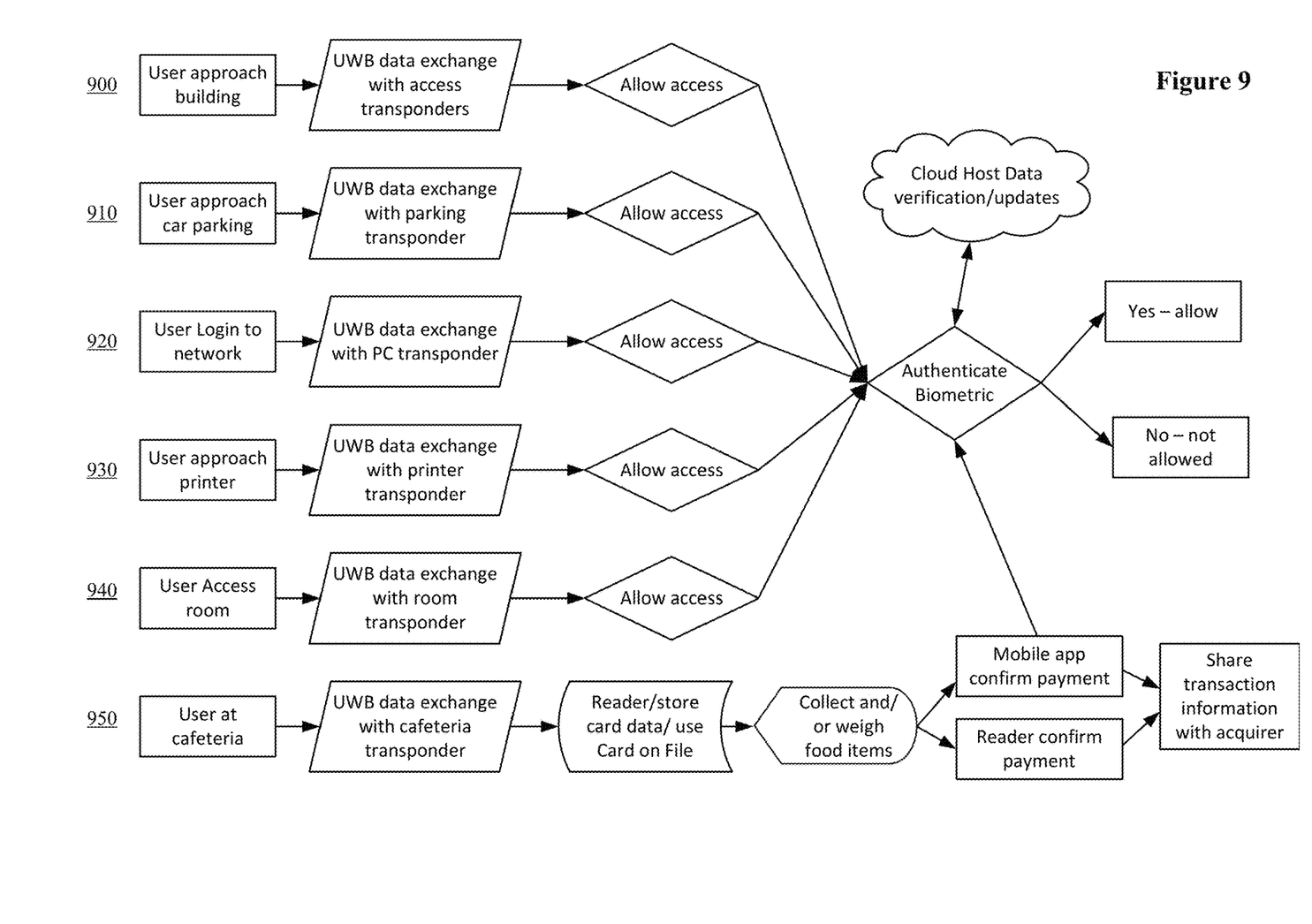
FIG. 9 illustrates an identifier access scenario.

FIG. 9 illustrates an identifier access scenario. Here, it is possible to provide authentication for campus and government identification, as well as support payment with the same device. A UWB-enabled device may be an ID card with embedded circuitry or a mobile computing device such as a smartphone. A customer/user can have a UWB-enabled chip ("UWB device" or "UWB module") inside a device such as a vehicle key, access card, fob, chip implant, phone. The UWB-enabled chip can be programmed with an appropriate identifier to allow predetermined functionality, such as access to an asset (e.g., environment, property, equipment, etc.), payment, and login. As illustrated by flows, 900, 910, 920, 930 and 940, a payment, access, or login application triggers customer authentication (e.g., biometric such as iris, fingerprint, voice) from the access device (e.g., a door lock for access, a POS for payment, and a PC for login). Any access scenario can include a payment transaction (e.g., to permit access or refresh an account to permit access) and may involve interactions such as described between a device and system as illustrated with respect to FIG. 2B). In flows 900, 910, 920, and 940, after successful authentication (and optional payment transaction), the user is allowed to access the environment they wish to enter. In flow 930, after successful authentication the user is allowed to use the equipment. The customer/user's entering and leaving of the environment may be logged to record their presence/participation. An acceptance application can be managed via cloud to verify and update the user profile. This can support audit processes such as reporting and tracking as well as provide data analytics.

The identification function can also support a frictionless retail environment such as shown in flow 950. In some cases, a pay-for-use feature is possible. For example, a user may walk into a service area and when entering is identified as present and card data is exchanged with the receiver (e.g., card present or card on file—CoF, following operations such as described with respect to FIG. 2B). The user can select items and services to be performed. Then when the user exits, the transaction is completed or the user is prompted to complete. The reader at the POS prepares the transaction information shared with the acquirer/payment gateway.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An ultra-wideband-enabled device comprising:
    a processor,
    a storage,
    an ultra-wideband (UWB) chip configured to transmit pulses and, upon receiving an indication of another UWB chip within a vicinity, perform ranging operations to determine distances between the UWB-enabled device and the other UWB chip, and
    instructions stored on the storage that when executed by the processor direct the UWB-enabled device to:
        engage the UWB chip to initiate the transmission of pulses;
        receive, via a secure communication channel established between the UWB chip and a UWB-enabled payment acceptance system comprising the other UWB chip, transaction related information;
        determine a proximity distance and approach angle to the UWB-enabled payment acceptance system is located based on the ranging operations of the UWB chip with respect to the other UWB chip at the UWB-enabled payment acceptance system; and
        upon a determination of being within a particular proximity distance and approach angle to the UWB-enabled payment acceptance system:
            generate a transaction payload based on the transaction related information; and
            communicate, via the secure communication channel established between the UWB chip and the UWB-enabled payment acceptance system, the transaction payload.

2. The UWB-enabled device of claim 1, wherein the transaction related information comprises an EMV data preference, the transaction payload being generated according to the EMV data preference.

3. The UWB-enabled device of claim 1, wherein the instructions further direct the UWB-enabled device to:
    initiate a wallet application; and
    receive, via the wallet application, a trigger to initiate payment towards the UWB-enabled payment acceptance system, wherein the transaction payload comprises tokenized credentials from the wallet application.

4. The UWB-enabled device of claim 3, wherein the wallet application is initiated in response to receipt of the transaction related information via the secure communication channel.

5. The UWB-enabled device of claim 1, wherein the transaction related information comprises merchant information, itemized goods, and a total amount, wherein the instructions further direct the UWB-enabled device to:
    initiate a payment application; and
    initiate a payment to a merchant identified by the merchant information via the payment application.

6. The UWB-enabled device of claim 5, wherein the payment application is initiated in response to receipt of the transaction related information via the secure communication channel.

7. The UWB-enabled device of claim 1, wherein the UWB-enabled payment acceptance system further comprises a fare gate.

8. The UWB-enabled device of claim 1, wherein the instructions further direct the UWB-enabled device to:
    receive, via a first secure communication channel established between the UWB chip and a third UWB chip associated with the UWB-enabled payment acceptance system, the transaction related information;
    initiate a payment application;
    receive, at the payment application, information of items for purchase; and
    add the items for purchase to a cart, wherein the transaction related information received via the first secure communication channel comprises the cart and a total amount.

9. The UWB-enabled device of claim 8, wherein the transaction related information further comprises an EMV data preference, the transaction payload being generated according to the EMV data preference.

10. The UWB-enabled device of claim 9, wherein the instructions further direct the UWB-enabled device to:

receive location-based content from at least one additional anchor via a communication channel established between the UWB chip and any of a plurality of anchors.

11. The UWB-enabled device of claim 1, wherein the UWB-enabled device is a vehicle.

12. The UWB-enabled device of claim 1, wherein the UWB-enabled device is a smartphone.

13. The UWB-enabled device of claim 1, wherein the instructions further direct the UWB-enabled device to receive an indication of pointing the UWB-enabled device in the direction of the other UWB chip of the UWB-enabled payment acceptance system to initiate a payment.

\* \* \* \* \*